United States Patent [19]

Akagawa

[11] Patent Number: 4,949,586

[45] Date of Patent: Aug. 21, 1990

[54] ACTUATOR SWING ARM MECHANISM

[75] Inventor: Minoru Akagawa, Fremont, Calif.

[73] Assignee: Intelmatic Corp., Fremont, Calif.

[21] Appl. No.: 268,377

[22] Filed: Nov. 7, 1988

[51] Int. Cl.⁵ .............................................. B25J 17/00
[52] U.S. Cl. .......................................... 74/96; 901/28
[58] Field of Search .................. 74/96; 901/23, 24, 28; 384/543, 586, 416

[56] References Cited

U.S. PATENT DOCUMENTS

| | | | |
|---|---|---|---|
| 4,505,166 | 3/1985 | Tesar | 901/23 X |
| 4,624,621 | 11/1986 | Murakami et al. | 901/28 X |
| 4,651,591 | 5/1987 | Wurst | 901/28 X |
| 4,655,675 | 4/1987 | Yasuoka | 901/28 X |
| 4,662,814 | 5/1987 | Suzuki et al. | 901/28 X |
| 4,797,061 | 1/1989 | Murukata | 901/23 X |
| 4,802,815 | 2/1984 | Funabashi et al. | 901/28 X |

FOREIGN PATENT DOCUMENTS

| | | | |
|---|---|---|---|
| 3444420 | 6/1986 | Fed. Rep. of Germany | 901/28 |
| 114051 | 7/1982 | Japan | 901/28 |

Primary Examiner—Peter R. Brown
Attorney, Agent, or Firm—Flehr, Hohbach, Test, Albritton & Herbert

[57] ABSTRACT

An actuator swing arm mechanism includes extension shafts which are rigidly and coaxially attached to the drive shaft of an actuator at one end and rigidly attached to a swing arm at the other end. These extension shafts, rather than the drive shaft of the actuator itself, are rotatably supported by supporting members such that the weight of a heavy load on the swing arm is communicated through these extension shafts to and carried by these supporting members and the drive shaft of the actuator is relatively unaffected by the load.

2 Claims, 1 Drawing Sheet

ACTUATOR SWING ARM MECHANISM

BACKGROUND OF THE INVENTION

This invention relates to an actuator swing arm mechanism and more particularly to a mechanism by which a rotary actuator of a robot causes a robot arm to swing.

Robots are coming to be used for performing tasks of various types. A robot for picking up an object and transporting it to another place, for example, is provided with a swing arm for reaching out to a target position and a rotary actuator for causing this arm to swing around an axis. Since the drive shaft of the rotary actuator and the swing arm are thus in a motion-communicating relationship, the load which is being supported by the swing arm may be directly applied onto the drive shaft of the actuator. If this is the case, the actuator must be designed so as to make its drive shaft sufficiently strong to withstand the load communicated from the swing arm. In the case of a robot intended to handle a large load, the actuator must be made correspondingly stronger and this may increase the cost of the actuator unreasonably.

SUMMARY OF THE INVENTION

It is therefore an object of the present invention to provide an actuator swing arm mechanism with which a rotary actuator with a relatively weak drive shaft can operate a swing arm adapted to carry a large load.

The above and other objects of the present invention are achieved by providing an actuator swing arm mechanism comprising extension shafts which are rigidly and coaxially attached to the drive shaft of an actuator on the one hand and rigidly attached to a swing arm on the other and these extension shafts, rather than the drive shaft of the actuator itself, are rotatably supported by supporting means. With such a mechanism, a heavy load on the swing arm is communicated through these extension shafts to and carried by the supporting means and the drive shaft of the actuator is relatively unaffected by the load.

BRIEF DESCRIPTION OF THE DRAWING

The accompanying drawings, which are incorporated and form a part of the specification, illustrate an embodiment of the present invention and, together with the description, serve to explain the principles of the invention. In the drawings.

DETAILED DESCRIPTION OF THE INVENTION

Figure 1:
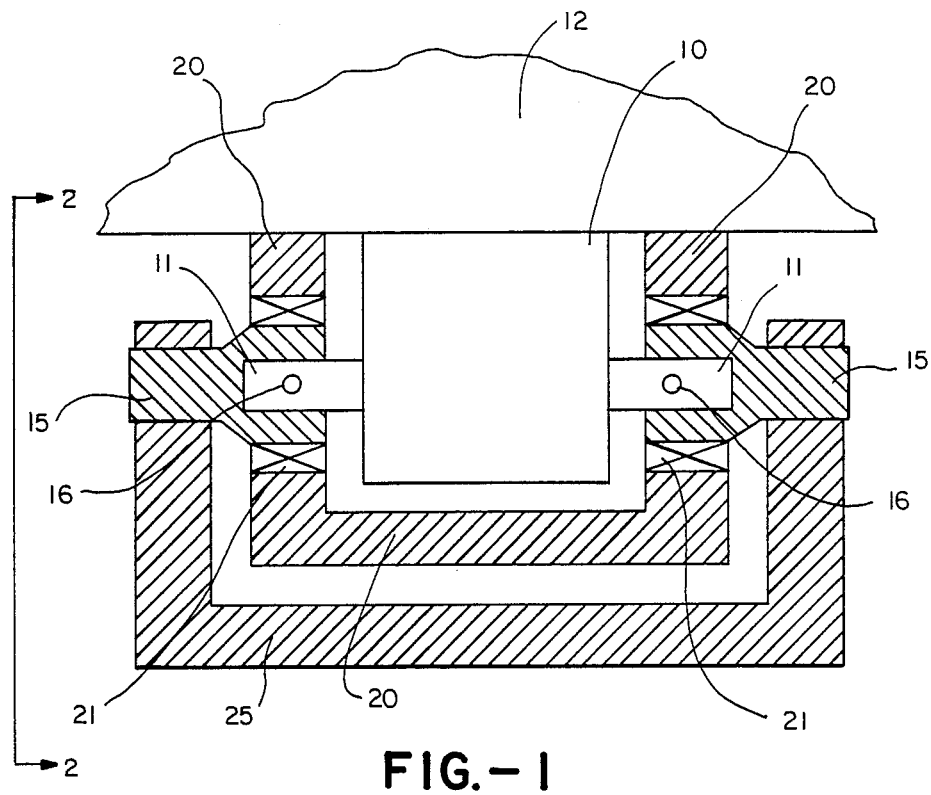
FIG. 1 is a sectional view of an actuator swing arm mechanism embodying the present invention.
Figure 2:
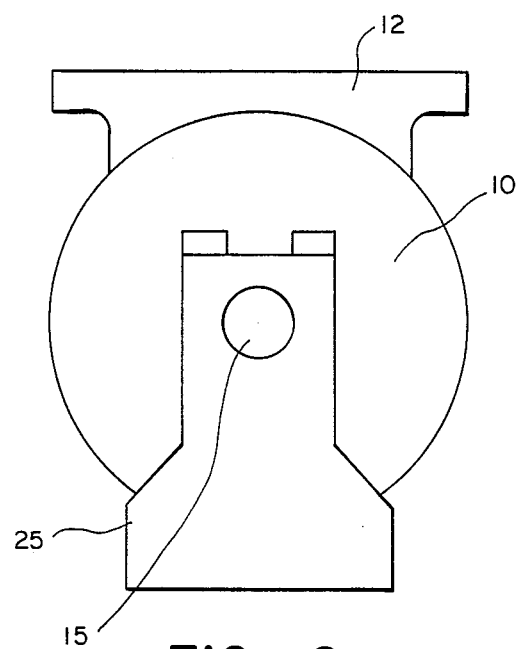
FIG. 2 is a side view taken along the line 2—2 in FIG. 1 of the mechanism.

With reference to the FIGS. 1 and 2 which schematically show the structure of an actuator swing arm mechanism embodying the present invention, a rotary actuator 10 with a rotatable drive shaft 11 is rigidly attached to the main body of a robot schematically shown at 12. The drive shaft 11 protrudes symmetrically to both sides of the housing of the actuator 10 and each of its ends fittingly engages inside a cylindrical tubular part of an extension shaft 15. These extension shafts are rigidly attached to the drive shaft 11 by means of dowel pins 16 so as to rotate unistructurally with the drive shaft 11. A supporting member 20 provided with bearings 21 is rigidly affixed to the main body 12 of the robot. The bearings 21 engage with the external surfaces of the cylindrical tubular parts of the extension shafts 15 so as to rotatably support the weight communicated thereto through the extension shafts 15. The outer ends of the extension shafts 15 distal from the actuator 10 are rigidly attached to ends of a swing arm 25 so as to rotatingly move therewith unistructurally. For convenience of illustration, no supporting members or apparatus for manipulating an object which may be attached to the swing arm 25 is shown but this swing arm 25 is understood to indeed serve as an arm of a robot to perform a specified function by means of apparatus attached thereonto and designed for the purpose.

With an actuator swing arm mechanism thus structured, the load on the swing arm 25 is communicated through the extension shafts 15 which envelope the drive shaft 11 of the actuator 10 internally but are supported from outside by a supporting member 20 rigidly attached to the main body 12 of the robot. Thus, the load communicated from the swing arm 25 to the extension shafts 15 are further communicated through supporting member 20 to the main body 12 of the robot which is presumably much stronger and can withstand a greater load than the drive shaft 11 of the actuator 10. In other words, the drive shaft 11 of the actuator 10 serves only to swing the swing arm 25 by communicating the motive force of the actuator 10 therethrough and through the extension shafts 15 and not to carry any significant portion of the weight of the loads. The drive shaft 11 therefore need not be made particularly strong and the actuator 10 accordingly need not be made larger.

The foregoing description of a preferred embodiment of the invention has been presented for purposes of illustration and description. It is not intended to be exhaustive or to limit the invention to the form disclosed, and many modifications and variations are possible in light of the above teaching. Any such modifications and variations that may be apparent to a person skilled in the art are intended to be included within the scope of this invention.

What is claimed is:

1. An actuator swing arm mechanism comprising
a rotary actuator affixed to a base, said rotary actuator having a rotatable drive shaft,
extension shafts firmly affixed coaxially to said drive shaft so as to rotate with said drive shaft, each of said extension shafts being provided with a cylindrical tubular section engaging said drive shaft therein,
a swing arm firmly attached to said extension shafts so as to move unistructurally with said extension shafts, and
supporting means affixed to said base for rotatably supporting said extension shafts such that a load on said swing arm is supported substantially entirely by said supporting means and only slightly by said drive shaft of said rotary actuator.

2. The actuator swing arm mechanism of claim 1 wherein said supporting means include bearings contacting said cylindrical tubular sections of said extension shafts.

* * * * *